United States Patent

[11] 3,611,409

[72] Inventor Roger C. Glidden
Wenham, Mass.

[21] Appl. No. 814,294
[22] Filed Apr. 8, 1969
[45] Patented Oct. 5, 1971
[73] Assignee The Glidden Electric Corporation

[54] TIME CODE RECORDING DEVICE
12 Claims, 12 Drawing Figs.

[52] U.S. Cl. .................. 346/20, 346/74 M, 340/347
[51] Int. Cl. .................. G07c 1/00
[50] Field of Search .................. 346/20, 74 M; 340/347 PR; 179/100.2

[56] References Cited

UNITED STATES PATENTS

| | | | |
|---|---|---|---|
| 2,977,583 | 3/1961 | Timothy et al. | 340/347 X |
| 3,372,240 | 3/1968 | Boyers et al. | 340/20 X |
| 3,375,526 | 3/1968 | Finlay | 346/74 X |

*Primary Examiner*—Joseph W. Hartary
*Attorneys*—Clarence A. O'Brien and Harvey B. Jacobson

ABSTRACT: The time at which a signal is received at a receiving station is recorded in code form on unmarked recording medium by encoding the time registered on a clock mechanism. A pulse code device driven by the recorder drive mechanism is rendered operative to record groups of signal pulse trains separated by spacing signals. Encoding devices select the number of signal pulses in each group in accordance with the time registering positions of timing wheels associated with the clock mechanism.

Roger C. Glidden
INVENTOR.

BY Clarence A. O'Brien
and Harvey B. Jacobson
Attorneys

Roger C. Glidden
INVENTOR.

BY Clarence A. O'Brien
and Harvey B. Jacobson
Attorneys

Roger C. Glidden
INVENTOR

BY Clarence A. O'Brien
and Harvey B. Jacobson
Attorneys

TIME CODE RECORDING DEVICE

This invention relates to the recording of time at which certain events occur and more particularly to the conversion of time units into signal pulse trains for recording on tape in response to receipt of a signal at a receiving station.

In connection with certain remote reporting systems such as disclosed in my prior U.S. Pat. No 3,390,234, it is necessary to record the time at which a signal is received at a receiving station. While it is a simple matter to record the signal on recording media such as magnetic tape, the time at which such signal is received must be registered usually by use of specially marked tape. The tape transport drive must also have a special clock mechanism incorporated therein and must operate continuously at a precise speed. It is therefore an important object of the present invention to record signal receipt time on magnetic tape or the like of a recorder by encoding the time registered on an independently operable clock mechanism so as to avoid continuous and precise speed regulation of the tape drive or specially time-marked tape.

In accordance with the present invention, the clock mechanism includes a plurality of timing wheels geared to each other for rotation at a progressively increasing drive ratio relative to the timing wheel of the lowest timing unit. The lowest timing unit wheel, is intermittently advanced by a clock drive mechanism. Each timing wheel drives a time encoding disk through which a number of signal pulses are selected representing the instantaneous position of the timing wheel and the time unit registered thereby. A pulse-generating mechanism is interconnected with the time-encoding disks associated with each of the timing wheels and generates the selected number of pulses for each of the timing wheels, said pulses being recorded on the magnetic tape of a tape recorder through its recording head in response to receipt of an input signal at the station with which the recorder is associated. The tape transport mechanism of the recorder may drive the pulse generator so that the pulse trains derived from the different timing wheel encoding disks may be sequentially recorded on the tape. Each group of signal pulses recorded on the tape is separated by a spacing signal generated by an oscillator which is activated during the recording of the groups of signal pulses representing the accumulated timing units registered by the timing wheels of the clock mechanism.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
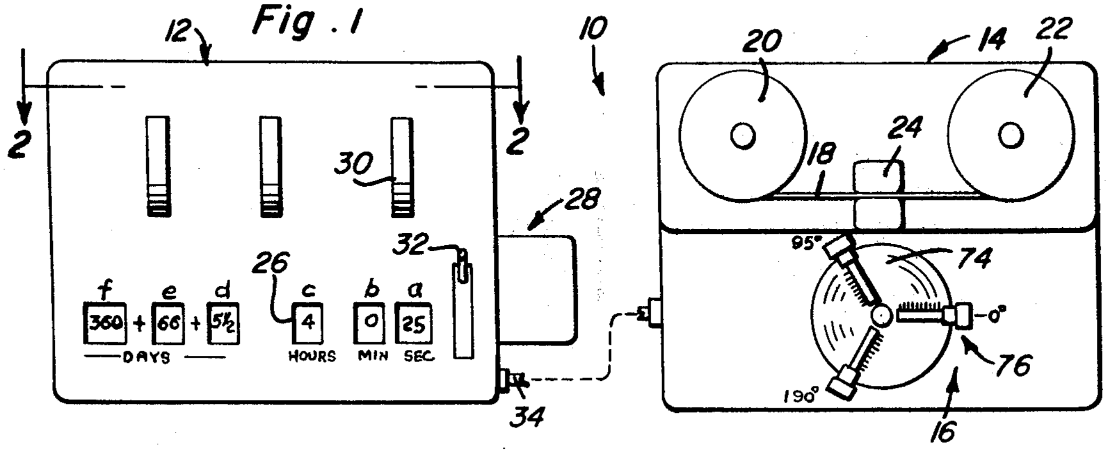
FIG. 1 is a simplified illustration of a clock mechanism and tape recorder modified in accordance with the present invention to form the time-accumulating readout device.

Referring now to the drawing in detail, FIG. 1 illustrates a time readout device generally referred to by reference numeral 10 which includes a time-encoding clock component generally denoted by reference numeral 12 and a tape recorder 14 interconnected therewith, the tape recorder being modified by or having associated therewith, a pulse-generating unit denoted by reference numeral 16 through which signal pulses are recorded on a recording medium such as the magnetic tape 18. Other recording media could of course be utilized such as wire, paper tape, etc. with corresponding recording apparatus. The recorder 14 as shown by way of example, is of a conventional type including a supply reel 20, a takeup reed 22, a conventional transport mechanism (not shown) for movement of the tape in one direction during the recording operation, signals being recorded on the tape through a recording head 24. Operation of the recorder is initiated and signals recorded on the tape 18 in code form when an input signal is received. The signals recorded on the tape represent the time registered by the clock component 12 at the instant the input signal is received.

The clock component 12 is of a type having six windows 26 on its display face through which timing units are visible to visually register time. A clock drive mechanism generally referred to by reference numeral 28 imparts movement to six timing wheels respectively associated with number displaying drums bearing timing units registered with the windows 26. Three manual turning knobs 30 project from the face of the clock component for resetting the timing wheels upon release thereof from the clock drive mechanism 28 by means of the release control 32. Time encoded signals are transmitted to the pulse-generating unit 16 from the clock component through cable 34 interconnected with the signal-generating unit.

Referring now to FIGS. 2, 4, 5 and 6 it will be observed that the windows 26 in the front face of the clock component are aligned with six indicia bearing drums 36 mounted on timing gear wheels 38. The timing gear wheels are axially aligned with each other and also mount time-encoding disk members 40. Thus, as each timing gear member is rotated, conductive portions on each of the time-encoding disk members 40 engage five bush elements 42 projecting from a support 44 associated with a stationary brush assembly 46 associated with each time-encoding disk member. Rotation of the timing gear members therefore both positions the time displaying drums 36 as well as to select a number of pulses corresponding to its instantaneous position as will be hereafter explained. The six timing gears 38 are further drivingly interconnected with each other by positive gear means as more clearly shown in FIG. 6. The timing gears are also geared to the manual adjustment gears 30. The gear train arrangement and the relative numbers of gear teeth are such as to produce a reduction gear ratio between the right hand timing gear 38 as viewed in FIG. 6 and each of the other timing gears. The reduction gear ratio increases from one timing gear to another at a fixed multiple of 12. Thus, for every revolution of the left-hand timing gear 38, the next timing gear in a right-hand direction rotates 12 revolutions. Furthermore, the timing gears are intermittently advanced incremental amounts by means of the clock drive mechanism 28 which is drivingly connected only to the right-hand timing gear 38 which is the most rapidly advanced timing gear. The input driven timing gear is advanced 12 increments each revolution so that the following timing gear is advanced one increment each revolution of the preceding timing gear. Between incremental advancement of the timing gears, the time unit displaying drums 36 will be held stationary in positions aligning the windows 26 with the time unit indicia on the drums.

As shown in FIG. 1, the windows 26 are labeled from right to left as seconds, minutes, hours and days. The summation of the timing units displayed in the last three windows 26 labeled "Days," constitute the number of days in the year beginning with Jan. 1. The time units displayed on the drums 26 labeled "*a*,""*b*," "*c*," "*d*," "*e*," and "*f*" in FIG. 1, are shown in the following chart.

CHART I.—DISPLAYED TIME UNITS $(12t_n = t_{n+1})$

| | Days=$t_6+t_5+t_4$ | | | Hrs., | Min., | Secs., |
|---|---|---|---|---|---|---|
| | f | e | d | c | b | a |
| Number of steps: | | | | | | |
| 0 | 0 | 0 | 0 | 0 | 0 | 0 |
| 1 | 72 | 6 | 0.5 | 1 | 5 | 25 |
| 2 | 144 | 12 | 1.0 | 2 | 10 | 50 |
| 3 | 216 | 18 | 1.5 | 3 | 15 | 75 |
| 4 | 288 | 24 | 2.0 | 4 | 20 | 100 |
| 5 | 360 | 30 | 2.5 | 5 | 25 | 125 |
| 6 | 432 | 36 | 3.0 | 6 | 30 | 150 |
| 7 | 504 | 42 | 3.5 | 7 | 35 | 175 |
| 8 | 576 | 48 | 4.0 | 8 | 40 | 200 |
| 9 | 648 | 54 | 4.5 | 9 | 45 | 225 |
| 10 | 720 | 60 | 5.0 | 10 | 50 | 250 |
| 11 | 792 | 66 | 5.5 | 11 | 55 | 275 |

Figures 3, 7:
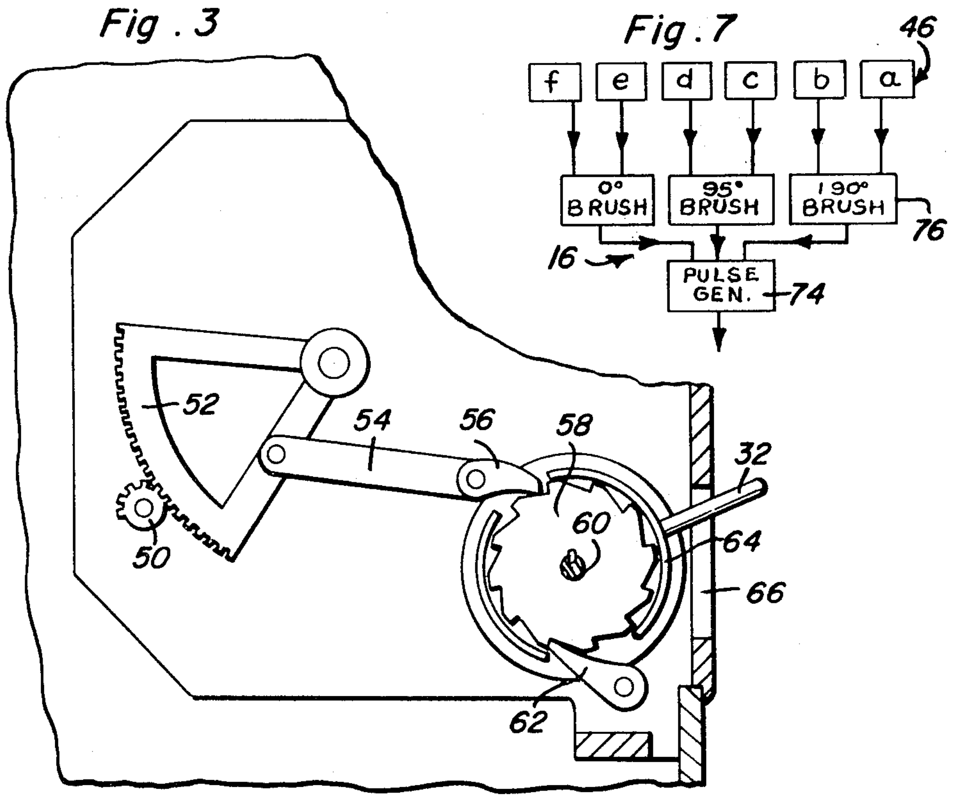
FIG. 3 is a partial sectional view taken substantially through a plane indicated by section line 3—3 in FIG. 2.
FIG. 7 is a block diagram schematically showing the arrangement of control components associated with the readout device.
Figure 4:
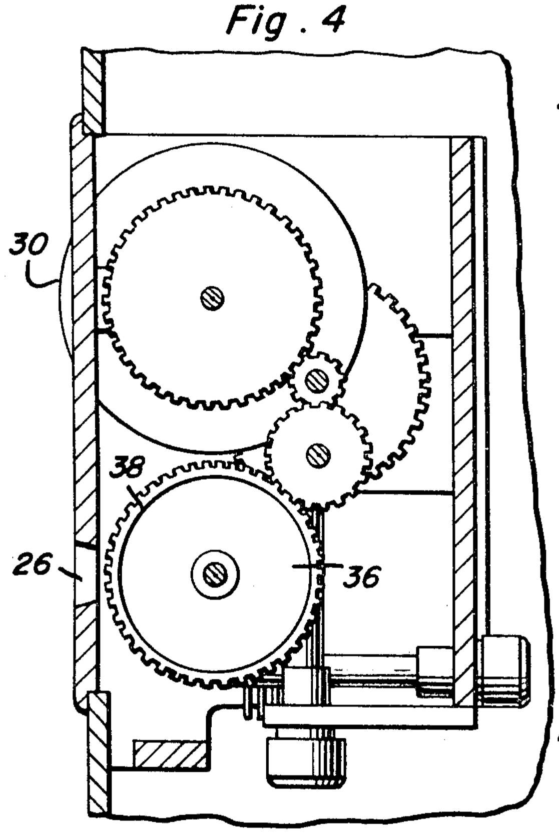
FIG. 4 is a partial sectional view taken substantially through a plane indicated by section line 4—4 in FIG. 2.
Figures 5, 6:
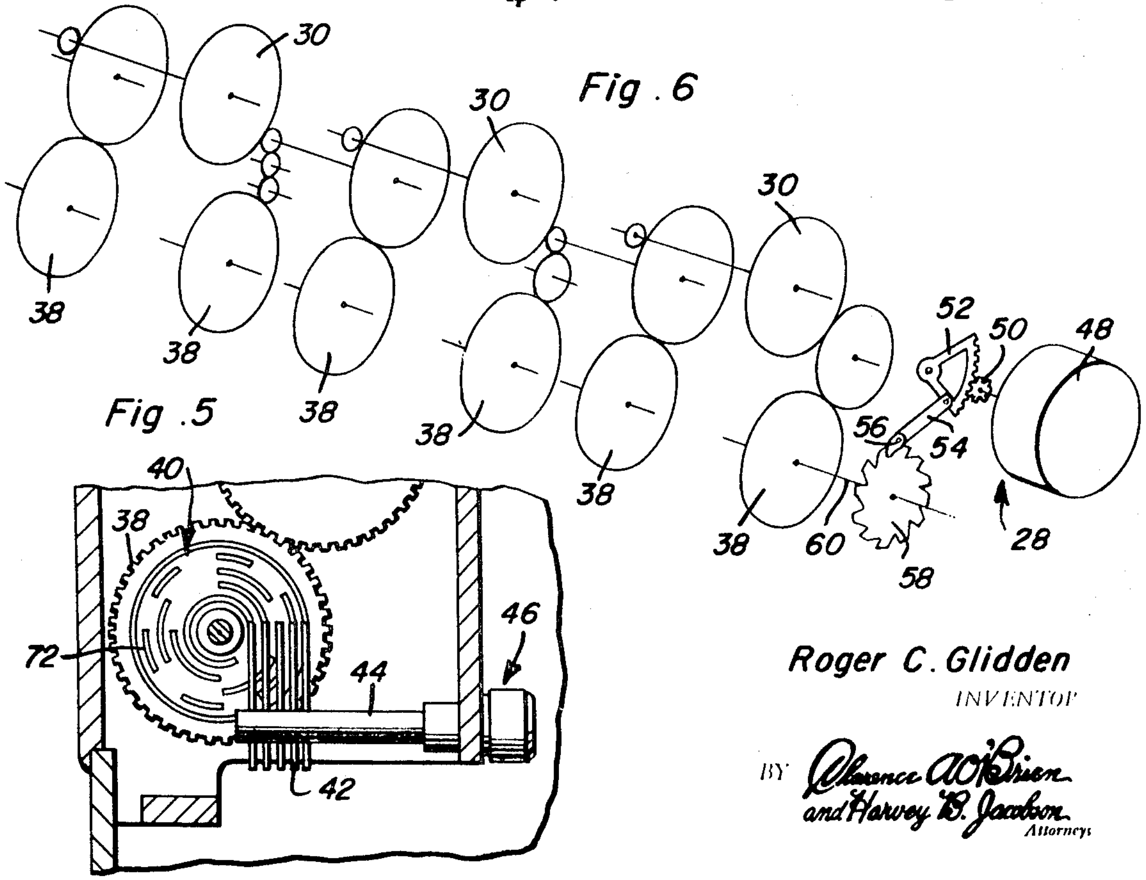
FIG. 5 is a partial sectional view taken substantially through a plane indicated by section line 5—5 in FIG. 2.
FIG. 6 is a perspective diagrammatic view of the drive train arrangement associated with the clock mechanism.

Referring now to FIGS. 3 and 6 in particular, it will be observed that the clock drive mechanism 28 includes a synchronous electric motor 48 adapted to continuously drive a pinion gear 50 from which a portion of the teeth are removed. The pinion gear 50 is in mesh with a sector gear 52. Accordingly, during each revolution of the pinion 50, the sector gear 52 will be angularly displaced by a predetermined amount and then released for reverse movement as the teeth on the pinion 50 move out of mesh with the teeth on the sector gear. A spring mechanism (not shown) reverses the movement of the sector gear during the period that the teeth of pinion 50 are out of mesh therewith. Accordingly, continuous rotation of the clock motor 48 is converted into oscillatory movement of the sector gear to which a connecting link 54 is pivotally connected for transmitting the reciprocatory movement to a drive pawl 56. The drive pawl is in engagement with the peripheral ratchet teeth on a ratchet wheel 58 secured by drive shaft 60 to the first timing gear 38. It will be apparent therefore, that the reciprocatory movement imparted to the pawl 56 by the oscillating sector gear 52 will intermittently rotate the ratchet wheel 58 and the timing gear connected thereto. Reverse movement of the ratchet wheel is prevented by a holding pawl 62. Both the drive pawl 56 and the holding pawl 62 project into engagement with the ratchet teeth on the ratchet wheel through slots in an annular release ring 64 rotatably mounted about the axis of the ratchet wheel. The release control 32 extends from the release ring 64 through a slot 66 formed in the front face of the clock mechanism. Thus, when the release control 32 is displaced downwardly within the slot 66, the release ring 64 will radially displace the drive pawl 56 and holding pawl 62 away from the ratchet wheel thereby disengaging the timing gears from the clock drive mechanism 28. The timing gears may then be rotated to a new position by any one of the three manual turning gears 30 dependent upon how rapidly the gears are to be rotated in order to reset the clock mechanism. Correct time will be registered by the clock mechanism with the speed of the clock drive motor 48 set to incrementally advance the ratchet wheel 58 one step every 25 seconds.

Figure 9:
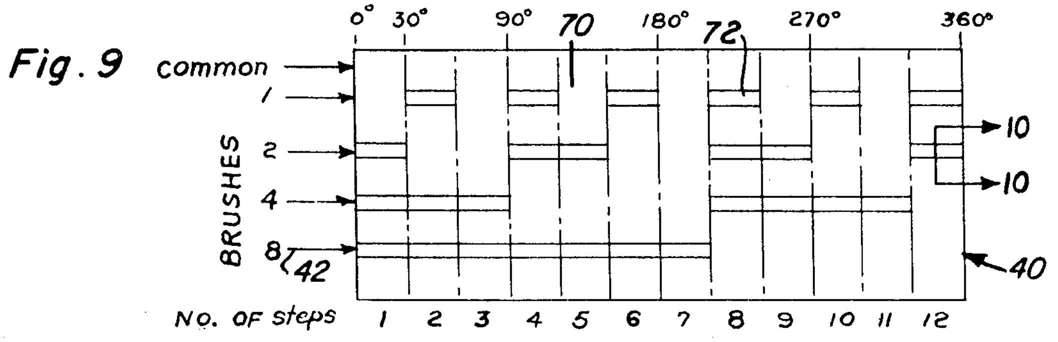
FIG. 9 is a layout view of one of the time encoding units.
Figures 10, 11, 12:
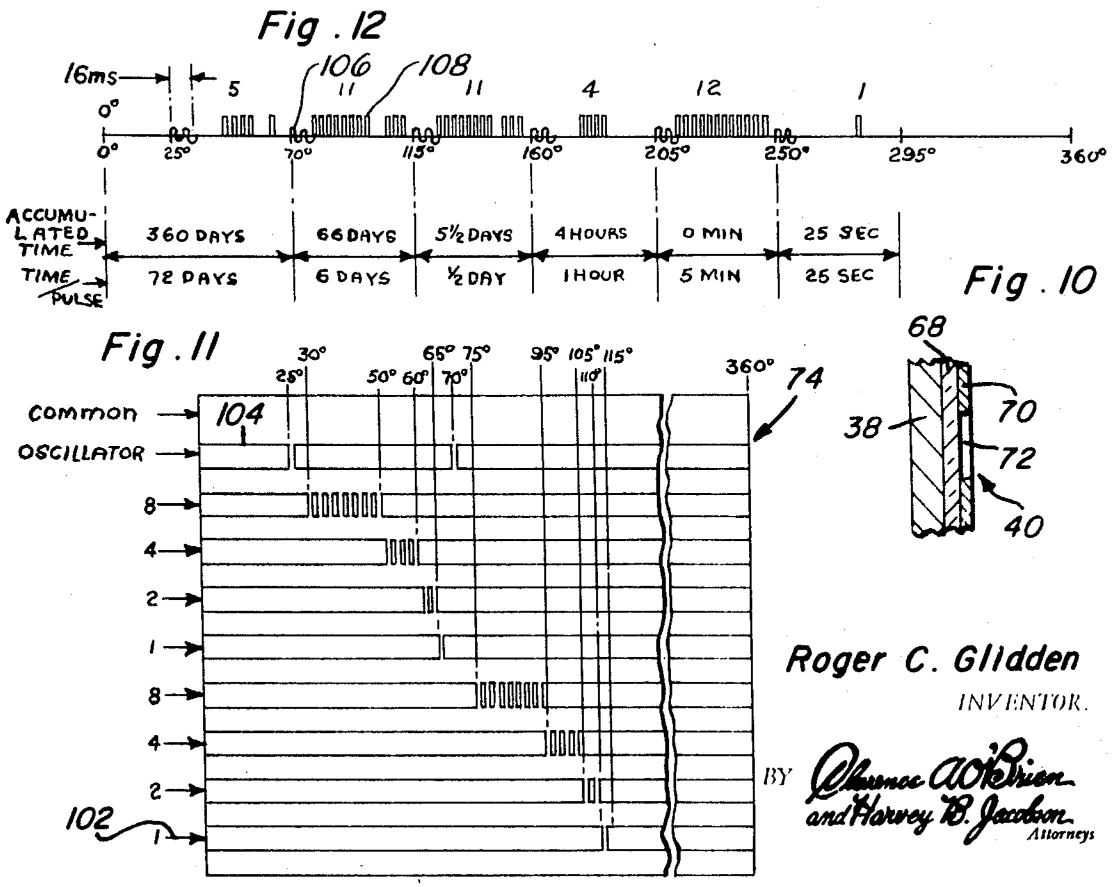
FIG. 10 is a partial sectional view taken substantially through a plane indicated by section line 10—10 in FIG. 9.
FIG. 11 is a layout view of the pulse generating unit.
FIG. 12 is a diagrammatic view of signals recorded on the magnetic tape of a recorder in accordance with the present invention.

Each of the time encoding disk members 40 includes a nonconductive base 68 as shown in FIG. 10 on which a conductive foil material 70 is mounted. Arcuate strips of the conductive foil are cutout as indicated at 72 in a coded pattern as shown in FIG. 5 for example. The cutout strips are aligned with the five brush elements 42 associated with the brush assembly 46 as aforementioned so that during rotation of the timing gear, electrical contact between each brush element and the conductive foil 70 will be established and broken. The five brush elements are represented by arrows in FIG. 9 labeled "COMMON," "1," "2," "4," and "8." The numbered brush elements represent the number of pulses to be selected. Further, FIG. 9 illustrates the angular pattern of the time encoding disk 40 as being divided into 12 30° increments. It will be observed that electrical contact is continuously established by the common brush element during the entire 360° rotation of the time encoding disk whereas electrical contact is established with different combinations of the pulse numbered brushes during each 30° increment, so that the total number of pulses selected by the brushes during each incremental position will correspond to the position of the timing gear or the number of steps that the timing gear is advanced from a zero starting position. Although a circular disk is illustrated, it should be apparent that the time-encoding member may also be in the form of a cylindrical drum or endless belt.

The pulse generator unit 16 as shown in FIG. 1, includes a single pulse-storing code disk 74 which is similar in construction to the time-encoding disks 40 hereinbefore described except for a pulse code pattern formed on its surface. The surface of the code disk 74 is engaged by three brush assemblies 76 which extend radially from its rotational center at 0°, 95° and 190° positions as shown for the purpose of controlling the sequence of pulse trains developed during rotation of the code disk 74. Each brush assembly 76 as diagrammatically shown in FIG. 7, is connected to two of the six brush assemblies 46 respectively associated with the different timing gears or time displaying drums identified as "*a*" through "*f*." Thus, the three brush assemblies 76 are operative to transmit the pulse selections from the time-encoding brush assemblies 46 to the pulse-storing code disk 74 which is connected to the recording head of the recorder.

Figure 8:
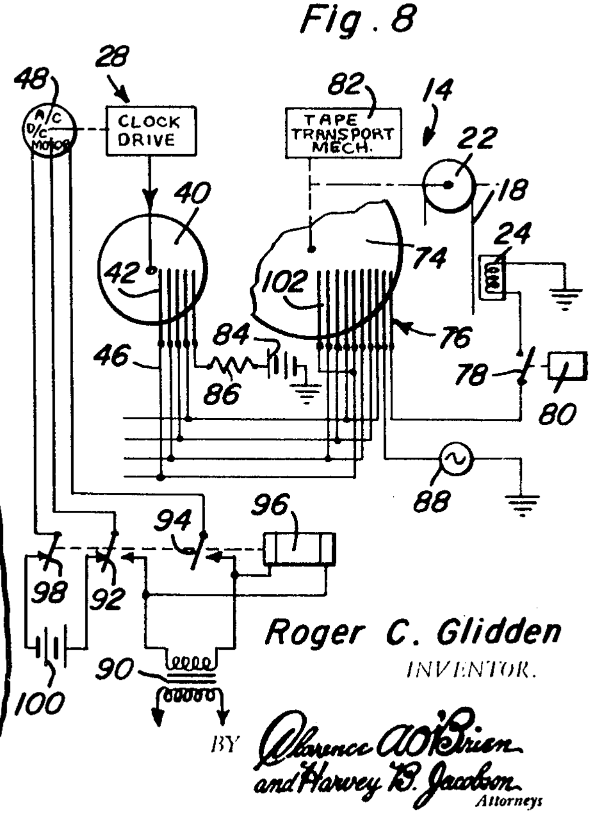
FIG. 8 is an electrical circuit diagram associated with the readout device.
Figure 2:
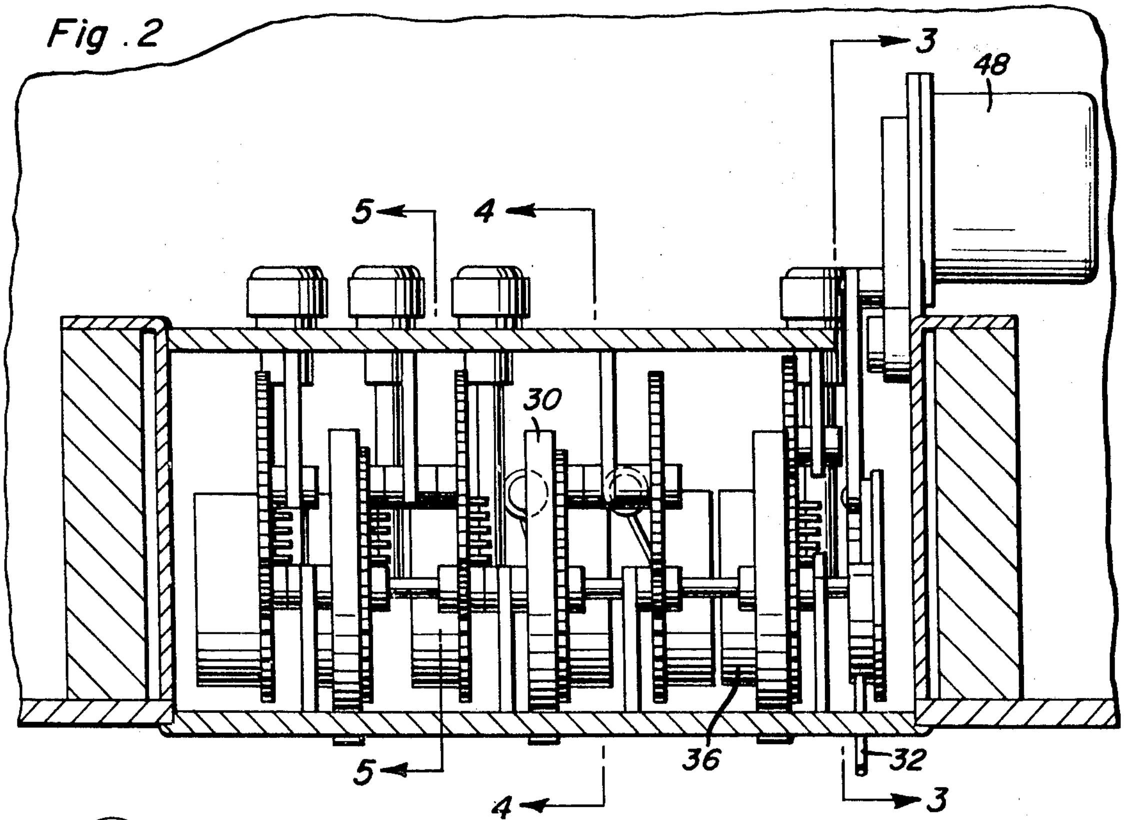
FIG. 2 is an enlarged partial sectional view taken substantially through a plane indicated by section line 2—2 in FIG. 1.

As shown in FIG. 8, a pulse-producing circuit is completed through the recording head 24 of the recorder upon closing of an input switch 78 in response to receipt of an input signal by the signal-receiving component 80. When the circuit is completed by closing of the switch 78, signal pulses are supplied to the recording head from one of the brush assemblies 76. These pulses are developed because of the opening and closing of a circuit by the brush assemblies 76 upon rotation of the code disk 74 by the tape transport mechanism 82 associated with the recorder 14. The voltage for generating the pulses is obtained from a DC source 84 connected by resistor 86 to the common brush element of each of the time-encoding brush assemblies 46. As hereinbefore explained in connection with FIG. 7, two brush assemblies 46 are connected to each of the three brush assemblies 76. Also connected to each of the brush assemblies 76, is an oscillator 88 from which a source of spacing signals is derived to be recorded on the tape 18 between the groups of signal pulses generated by interruption of the circuit extending from the DC voltage source 84.

As also shown in FIG. 8, the time-encoding disks 40 are driven by the clock drive mechanism 28 as hereinbefore described in detail. The drive motor 48 is of the AC-DC type adapted to be ordinarily energized from an AC source through transformer 90 connected to the motor 48 through relay switches 92 and 94 when the relay coil 96 is energized. The relay coil 96 being connected across the secondary circuit of the transformer 90 will be in an energized condition as long as the AC power supply is available. Should this power supply fail however, the relay coil 96 becomes deenergized so that relay switches 92 and 98 return to the positions illustrated in FIG. 8. The motor 48 is then connected across a standby DC source of voltage 100.

With reference to FIG. 8 again, each of the brush assemblies 76 associated with the pulse-developing code disk 74 mounts 10 brush elements 102, said brush elements being diagrammatically represented by arrows in FIG. 11 which shows the code disk member 74 in rectangular layout form on which pulse information is stored. The brush elements are aligned with cutout strips 104 in the conductive surface of the code member 74 exposing the nonconductive base. Accordingly, electrical contact is interrupted and reestablished with the brush elements except for the brush element labeled "COMMON" which is in continuous electrical contact with the conductive surface of the code member 74, this brush element being electrically connected to the input switch 78. The brush element labeled "OSCILLATOR" on the other hand is electrically connected to the output of the oscillator 88 so that a spacing signal will be transmitted to the recording head through the conductive surface of the code member 74 during 16 millisecond intervals at two angularly spaced positions of the code member 74 relative to the brush element. Four pulse numbered brush elements below the oscillator brush element as shown in FIG. 11, are respectively connected to like-numbered brush elements 42 of one of the brush assemblies 46, the second group of four brush elements as labeled in FIG. 11 being similarly connected to like-numbered brush elements 42 in the other of the two brush assemblies 46 with which each brush assembly 76 is associated. Thus, the eight brush elements 102 below the common and oscillator brush elements as shown in FIG. 11, will transmit a different number of pulses to the recording head when the brush elements 42 to which they are electrically connected complete circuits from the associated DC source 84. The brush elements 42 associated with the brush assemblies 46 will therefore select the number of pulses transmitted during 45° increments of rotation of the code member 74. Further, at the beginning of each 45° increment which starts 25° from a zero or starting position, a 16 millisecond spacing signal 106 (FIG. 12) derived from the oscillator 88 will be transmitted to the recording head. In this manner, whenever the input switch 78 is closed, in response to receipt of an input signal, the recording head will record spaced groups of signal pulses 108 on the tape 18 as diagrammatically shown in FIG. 12, each group of pulses being recorded within a 45° interval of rotation of code member 74 and each group of signal pulses being recorded in a sequence corresponding to the different timing gears and associated time displaying drums of the clock mechanism. The recording gaps at the beginning and end of a time-recording pulse train sequence will separate different signal receiving times recorded. The number of pulses in each group will of course be selected in accordance with the instantaneous position of the corresponding timing gear drums so that the pulses recorded on the tape will represent the accumulated time registered by the clock mechanism. The pulses within each of the spacing signal separated groups represents a different number of time units as also diagrammed in FIG. 12 so that the accumulated time may be decoded as indicated in FIG. 12. The foregoing code conversion is summarized in the following chart:

CHART II

| Angular positions of code wheel | Spacing signal | Timing wheels encoded | | | | | |
|---|---|---|---|---|---|---|---|
| | | 0° Brush | | 95° Brush | | 190° Brush | |
| | | *f* | *e* | *d* | *c* | *b* | *a* |
| 0°–25° | | | | | | | |
| 25°–30° | X | | | | | | |
| 30°–70° | | X | | | | | |
| 70°–75° | X | | | | | | |
| 75°–115° | | | X | | | | |
| 115°–120° | X | | | | | | |
| 120°–160° | | | | X | | | |
| 160°–165° | X | | | | | | |
| 165°–205° | | | | | X | | |
| 205°–210° | X | | | | | | |
| 210°–250° | | | | | | X | |
| 250°–255° | X | | | | | | |
| 255°–295° | | | | | | | X |
| 295°–360° | | | | | | | |

The time recording system herein described will not only be useful in recording the times at which events are reported through telephone lines to the receiving component 80, but may also record the times at which power in the telephone lines is lost and restored. The telephone lines could also be the source of trickle charge for a battery from which the clock motor 48 is ordinarily energized. Also, the pulse-storing disk 74 and the tape transport mechanism 82 may be driven by power derived from the telephone lines since the energy consumption involved would be small and intermittent.

What is claimed as new is as follows:

1. In combination with a clock mechanism having a plurality of timing wheels advanced at different rates, a recorder having a recording head and a transport mechanism for advancing a recording medium, readout means comprising common pulse-storing means driven independently of the clock mechanism for cyclically presenting coded date from which signal pulses are derived, a plurality of digital encoding devices respectively driven by each of said timing wheels for selecting different numbers of said signal pulses from the pulse-storing means in accordance with the positions of the respective timing wheels, and signal-generating means interconnecting the digital encoding devices and the pulse-storing means with the recording head for recording the different numbers of pulses selected by each of the digital encoding devices, in sequence, on the recording medium.

2. The combination of claim 1 wherein said clock mechanism further includes input drive means connected to only one of the timing wheels for intermittent advancement thereof, and positive gear means drivingly interconnecting the timing wheels for rotation at different reduction drive ratios relative to said one of the timing wheels.

3. The combination of claim 2 wherein said reduction drive ratios differ from each other by a fixed multiple and the maximum number of signal pulses in each of said groups being equal to said fixed multiple.

4. The combination of claim 3 wherein each of said encoding devices includes a pulse-selecting contact member driven by an associated one of the timing wheels, and brush means operatively connecting the contact member to the pulse-producing means.

5. The combination of claim 4 wherein the pulse-storing means includes a pulse code member driven by the transport mechanism and a plurality of spaced brush assemblies in contact with said code member.

6. The combination of claim 5 wherein the signal-generating means includes a continuous source of voltage connected to each of the encoding devices in series with the pulse storing means to the recording head and an oscillator connected by the pulse-storing means to the recording head for recording spacing signals between groups of the selected numbers of pulses.

7. The combination of claim 1 wherein each of said encoding devices includes a pulse-selecting contact member driven by an associated one of the timing wheels, and brush means operatively connecting the contact member to the pulse-producing means.

8. The combination of claim 7 wherein the pulse-storing means includes a pulse code member driven by the transport mechanism, and a plurality of spaced brush assemblies in contact with said code member.

9. The combination of claim 8 wherein the signal-generating means includes a continuous source of voltage connected to each of the encoding devices in series with storing means to the recording head and an oscillator connected by the pulse-storing means to the recording head for recording spacing signals between groups of the selected numbers of pulses.

10. The combination of claim 1 wherein the pulse-storing means includes a pulse code member driven by the transport mechanism, and a plurality of spaced brush assemblies in contact with said code member.

11. The combination of claim 10 wherein the signal-generating means includes a continuous source of voltage connected to each of the encoding devices in series with the pulse storing means to the recording head and an oscillator connected by the pulse-storing means to the recording head for recording spacing signals between groups of the selected numbers of pulses.

12. The combination of claim 1 wherein the signal-generating means includes a continuous source of voltage connected to each of the encoding devices in series with the pulse-storing means to the recording head and an oscillator connected by the pulse-storing means to the recording head for recording spacing signals between groups of the selected numbers of pulses.